United States Patent [19]

Skvára et al.

[11] Patent Number: 4,551,176
[45] Date of Patent: Nov. 5, 1985

[54] RAPIDLY BINDING HIGH-STRENGTH CEMENT BINDING AGENT AND A METHOD OF ITS PREPARATION

[76] Inventors: František Skvara, No. 18 Jireckova, Praha 7; Karel Kolar, No. 38 Yostrovska, Praha 6; Zdenek Zadák, No. 733 Na Magistrale, Kolin; Zdenek Friml, No. 543 Rybalkova, Jaromer; Jaroslay Novotry, No. 13 Nad Sarkou, Praha 6, all of Czechoslovakia

[21] Appl. No.: 505,238

[22] Filed: Jun. 16, 1983

[51] Int. Cl.$^4$ ................................ C04B 7/35
[52] U.S. Cl. ........................ 106/90; 106/102; 106/315
[58] Field of Search .............. 106/90, 102, 315

[56] References Cited

U.S. PATENT DOCUMENTS

| | | | |
|---|---|---|---|
| 3,997,502 | 12/1976 | Schaupp | 106/90 |
| 4,066,469 | 1/1978 | Shiel et al. | 106/90 |
| 4,125,410 | 11/1978 | Natsuume | 106/314 |
| 4,238,236 | 12/1980 | Falcoz et al. | 106/90 |
| 4,247,334 | 1/1981 | Falcoz et al. | 106/314 |
| 4,280,848 | 7/1981 | Ellis et al. | 106/90 |
| 4,309,325 | 1/1982 | Laquerbe et al. | 106/90 |
| 4,330,334 | 5/1982 | Schaupp et al. | 106/315 |
| 4,373,956 | 2/1983 | Rosskopf | 106/90 |
| 4,454,311 | 6/1984 | Bürge et al. | 106/90 |
| 4,479,826 | 10/1984 | Papalos et al. | 100/315 |

*Primary Examiner*—Andrew H. Metz
*Assistant Examiner*—Terryence Chapman

[57] ABSTRACT

The invention relates to an hydraulic binding agent with a controlled setting time, which attains high strength from the beginning of setting.

The hydraulic binding agent is prepared from (a) 85 to 99.89% cement clinker, with the specific surface area of 150 to 3000 m$^2$/kg and with 5 to 95 weight % of particles smaller than 5 μm, (b) 0.01 to 10 weight % salt of sulfomethylated condensation product of phenols with formaldehyde wherein up to 70% of the acidic groups are coupled by a trivalent cation from the metal group consisting of iron, aluminum and chromium, (c) 0.1 to 10 weight % alkaline hydroxide, carbonate, hydrogencarbonate, silicate, hydrogensilicate, hydrogensulfite or oxalate, and (d) at least 20 weight % of formation water. The condensation product may be partly oxidized.

The hydraulic binding agent is suitable for numerous purposes in the building industry.

8 Claims, No Drawings

RAPIDLY BINDING HIGH-STRENGTH CEMENT BINDING AGENT AND A METHOD OF ITS PREPARATION

BACKGROUND OF THE INVENTION

The invention pertains to a hydraulic binding agent based on cement clinker ground without addition of gypsum and provides a composition of a binding agent with controlled beginning of setting, where high values of strength increase from the beginning of setting. The invention further pertains to a method of preparation of said binding agent and of other products from it.

A cement clinker is obtained by calcination of the ground mixture of limestone and clays to a temperature of about 1400° C., when the mixture sinters. The most common type of cement is portland cement, which is obtained by grinding the cement clinker with the addition of gypsum as a regulator of setting. A binding agent, obtained by grinding a cement clinker without gypsum, sets instantaneously and is unsuitable for current applications. For this reason the recent binding agents based on silicates always contain gypsum as an additive added predominently during the cement grinding. Gypsum is considered a very common additive in portland cement. Other additives, particularly various plasticizers, added into portland cement are considered only in combination with gypsum.

P. A. Rebinder et al. (Doklady Akad. Nauk SSSR, 117, 1034-1036 (1956)) proved that the mixture of calcium lignosulfonate with $K_2CO_3$ causes retardation of the beginning of setting of cement pastes with the subsequent considerable acceleration of the hydration process. This effect was found both with a finely ground clinker of specific surface area 450 $m^2/kg$ prepared without gypsum and with portland cement containing gypsum. S. Brunauer described in U.S. Pat. No. 3,689,294 a binding agent, which attains much higher strength than common portland cements. He concluded that high strengths of setting cement pastes, mortars and concretes based on a ground cement clinker may be achieved in the absence of gypsum but in the presence of other setting regulators. The above patent disclosed the method of preparation of an expansible cement binding agent by grinding a portland clinker with at least 0.002 weight parts of an auxiliary grinding agent to the cement with the specific surface area ranging from 600 to 900 $m^2/kg$ and mixing the ground cement with at least 0.0025 weight parts of alkaline or alkaline earth lignosulfonate or sulfonated lignin and with 0.20 to 0.28 weight parts of water containing dissolved at least 0.0025 weight parts of alkaline carbonate, calculated on one part of ground cement. L. Stryker concluded in U.S. Pat. No. 3,959,004 that alkaline hydrogencarbonate can be used in gypsum-free cements instead of alkaline carbonate. He described a method for the preparation of a gypsum-free loosely running cement paste of low porosity manufactured by grinding the hydraulic clinker to a fineness of 350 to 900 $m^2/kg$ with 0.1 to 1% alkaline or alkaline earth lignosulfonate or sulfonated lignin in combination with 20 to 40% water containing 0.1 to 2% alkaline hydrogencarbonate and the subsequent mixing of all components, where all percent values are related to dry cement.

Ball et al. described in U.S. Pat. No. 3,960,582 the composition of a mixture for the preparation of cement paste in such a way, also that portland cement may be used instead of the clinker ground without gypsum and, further, alkaline lignin may be employed in addition to lignosulfonates and sulfonated lignin. The same authors described in U.S. Pat. No. 4,032,353 the composition of a mixture of low porosity consisting of aggregates, a hydraulic cement without gypsum of the specific surface area above 200 $m^2/kg$, alkaline hydrogencarbonate in the amount of at least 0.1% related to the dry cement, and a lignin derivative in the amount at least 1% related to the dry cement. The water-to-cement ratio ranged between 0.4 and 0.15.

The composition of gypsum-free very rapidly setting binding agent, based on the cement ground to the specific surface area ranging from 300 to 700 $m^2/kg$ and containing acidic salts, as hydrogencarbonates, hydrogensulfates, alkaline hydrogensulfites as well as salts of phosphorus-free organic acids, is known from U.S. Pat. No. 4,066,469. The additives are present in the mixture in the amount 0.1 to 10% calculated on the weight of ground cement.

The beginning of setting of pastes, mortars and concrete mixtures depends usually on the cement composition, the amount of water used and the temperature of the processed mixture and of the environment, particularly of the atmosphere. The time for which it is possible to keep the paste, mortar or concrete mixture in a processable state, i.e. the period of time from the beginning of its setting during which some technical procedures should be made, e.g. before consolidation of concrete, is also of great importance in this case. Such technical procedures are above all transportation and storage of the mixture. If handling of a concrete mixture requires relatively longer time or if the operation proceeds at unsuitably high temperature, the course of initial hydrogen has to be slowed down by at least 6% of the period of time. This may be achieved by admixing suitable chemical compounds.

It has been found during investigation and testing of various additives to binding agents, that additives which retard the setting should meet the following conditions: they should slow down the hardening of pastes, mortars and concretes without negative effect on their properties, such as compression strength, tensile strength and bending strength; they should also favourably affect the moduli of elasticity and deformability, volume changes, resistance to unsuitably low temperature and resistance to efflorescence. They should also act as a suitable plasticizer of the mixture. The additives to hydraulic binding agents known till now meet only some of the above requirements and are responsible for the search for new additives or their new combinations with better effects to help in the preparation of hydraulic binding agents with broader applications.

This invention also pertains to a method for the preparation of rapidly binding high-strength cement binding agent for the manufacturing of mortars, pastes and concretes, which setting is sufficiently fast but controllable and which imparts high strength to the set masses from the beginning of setting. U.S. Pat. No. 3,689,294 revealed the preparation of loosely running expansible cement paste by grinding the portland cement clinker with an auxiliary grinding agent to the specific surface area 600-900 $m^2/kg$ and the subsequent mixing of the ground clinker with alkaline or alkaline-earth salts of lignosulfonate or sulfonated lignin, where the cement prepared in this way is mixed with formation water containing alkaline carbonate.

Another modification of the preparation of cement pastes is known from U.S. Pat. No. 3,960,582 and consists in the grinding of a portland cement clinker with alkaline hydrogencarbonate without the addition of gypsum, and optionally also with alkaline or alkaline-earth lignosulfonate or a salt of sulfonated lignin, followed by mixing the cement prepared in this way with formation water.

U.S. Pat. No. 4,032,353 protects the manufacturing of loosely running concretes based on mixing a clinker or hydraulic cement, ground to the specific surface area larger than 200 m$^2$/kg, with alkaline hydrogencarbonate and the subsequent preparation of a paste by its mixing with formation water which contains the dissolved lignin derivative.

The above mentioned procedures accelerate the setting of resulting concretes and mortars, but the initial onset of strength of setting concretes and mortars, but the initial onset of strength of setting concretes and mortars is slow and handling of articles prepared in this way is possible only after attaining a reasonable limit of strength. This pause in technology deteriorates the rhythm of production.

OBJECTS AND ADVANTAGES OF THE INVENTION

An objective of the invention is a rapidly binding high-strength cement binding agent containing a hydraulic cement ground, without addition of gypsum, to the specific surface area 150 to 3000 m$^2$/kg, which cement contains 5 to 95 wt.% of particles smaller than 5 $\mu$m, a compound selected from the group comprising an alkaline hydroxide, carbonate, hydrogen-carbonate, silicate, hydrogensilicate, hydrogensulfite or oxalate in the amount 0.1 to 10 wt.% related to the weight of ground cement, a salt of sulfomethylated condensation product of phenols with formaldehyde, where up to 70% of acidic groups of this product is occupied by a trivalent cation selected from the group comprising iron, aluminum and chromium in the amount 0.1 to 5 wt.% to the weight of ground cement, and formation water in the amount at least 20 wt.% related to the weight of ground cement.

Another objective of the invention is a method for manufacturing the rapidly binding high-strength cement binding agent by grinding the clinker of portland cement in the absence of gypsum to the specific surface area 150 to 3000 m$^2$/kg and to the proportion of particles smaller than 5 $\mu$m ranging from 5 to 95 wt.%, dissolution of 0.1 to 5 wt.% of a salt of sulfomethylated condensation product of phenols with formaldehyde, which is, if desired, transferred into a quinoic form by action of at least 0.5 weight parts of oxygen related to one weight part of phenols, where up to 70% of acidic groups of this product is occupied by a trivalent cation selected from the group comprising iron, aluminum and chromium, together with 0.1 to 10 wt.% of a compound selected from the group comprising an alkaline hydroxide, carbonate, hydrogencarbonate, silicate, hydrogensilicate, hydrogensulfite or oxalate in the formation water, and by mixing the ground cement with at least 25 wt.% of formation water, whereas all percent parts are related to the dry substance of ground cement.

The hydraulic binding agent, prepared according to the invention, has a reasonably controllable beginning of setting and is suitable for broad applications. Another advantage of this binding agent is high values of strength achieved already in the beginning of setting which contribute to acceleration of processes. Further merit of the binding agent is better formability which allows addition of less formation water without worsening the workability. The absence of gypsum is important to retain the effects of the binding agent, because gypsum deteriorates the rapid increase of strength and formability. The faster increase of initial strengths of the cement binding agent according to the invention is manifested above all in substantially higher strengths during the setting of binding agent at low temperature, particularly at temperature below zero degrees of centrigrade, and in acceleration of setting by higher environmental temperature, e.g. at steam curing.

An advantage of the method for manufacturing the hydraulic silicate binding agent according to the invention consists in a sufficiently fast and controllable setting of mortars, pastes and concretes prepared from this binding agent, which exhibits high values of strength from the beginning of setting. Other advantages of said binding agent is its self-spreading capacity and that the setting mortars and concretes do not possess an unfavourable channel porosity, but instead possess closed pores.

The binding agent prepared by the method according to the invention may be worked with addition of further common components, as e.g. sand and rough, compact or porous aggregates. Pastes, mortars and concretes prepared with this binding agent are marked by:

(a) A good workability even with small additions of formation water, the amount of which is expressed by the water coefficient w, i.e. with pastes of w lower than 0.20 and mortars of w=0.25; the onset of setting is reasonable also with concretes;

(b) a low porosity of setting mass, where the main carrier of strength is the compact binder composed mainly from hydrosilicates, which does not virtually contain crystal forms typical for portland cement, e.g. the crystals of portlandite;

(c) a high short-termed and long-termed strengths which class these binding agents with rapidly binding and high-strength cements;

(d) an ability of pronounced acceleration of strength development by short heating, i.e. by a heat shock, or by a small increase of environmental temperature;

(e) an ability to set and harden also at temperature below +8° C. and at temperature as low as −40° C.; and (f) a high resistance towards corrosive medium, as e.g. in the presence of sulfuric acid, sulfate and chloride ions.

SUMMARY OF THE INVENTION

These properties of the binding agent, prepared according to the invention, are qualitatively independent of the size of the specific surface area of the ground cement clinker. The size of specific surface area of the ground cement clinker may influence these properties in a quantitative sense and therefore the described properties of binding agent are not qualified by high specific surface areas of the ground cement clinker.

Mono- , di- and trihydric phenols and their derivatives are used for the preparation of sulfomethylated condensation products with formaldehyde, either as such or as a mixture. The most common raw materials are phenols, cresols, xylenols, pyrocatechol and its homologues, resorcinol and technical mixtures of diphenols containing mainly o-diphenols, which are by-products in the processing of brown coal, and may be advantageously used in the industrial production of condensation products. The content of polyhydric phenols and their derivatives, esp. of o-diphenols, is important to achieve optimal dispersion and retarding properties of the condensation products.

The structure of sulfomethylated condensation product with acidic groups occupied by a metal Me can be expressed as follows for pyrocatechol and a four-nuclear condensate:

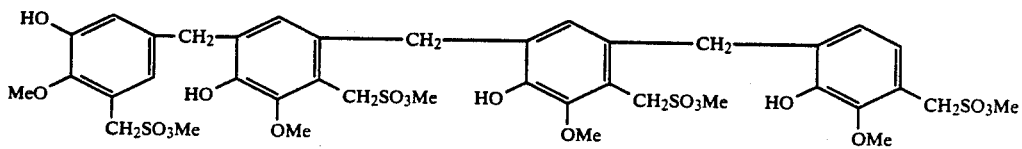

Further modification of the condensation product by modest oxidation gives rise to quinoic grouping in the structure, which can be drawn for pyrocatechol and a trinuclear condensate as follows:

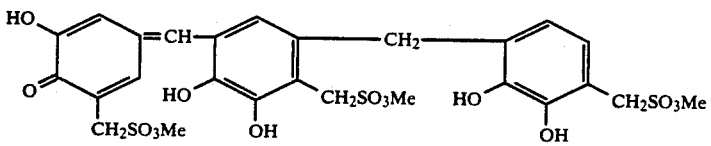

The metal Me is usually sodium cation which is replaced up to 70% with a trivalent cation $Fe^{3+}$, $Al^{3+}$ or $Cr^{3+}$ with formation of a complex. These condensation products may cause, in some cases, an increased air content in the prepared binding agent. Such case can be prevented by addition of commercial defoamers, as e.g. silicon oil, tributyl phosphate, 2-ethylhexanol, in a trace amount.

The ground cement clinker, which is used in the preparation of the binding agent, is ground in the absence of gypsum to the specific surface area sometimes higher than is the specific surface area of common cements. In such cases, it is necessary to prevent the agglomeration of particles during grinding by using grinding intensifiers. The known compounds, as ethylene glycol, diethyl carbonate, and others, may serve as such intensifiers. Application of powdered grinding additives, such as lignin derivatives, have proved to be suitable. Also, the phenolic condensate according to this invention acts as the intensifier enabling the attainment of high specific surface areas of cements.

Cement clinkers of Czechoslovak provenance were used in experimental preparations of the cement binding agent according to the invention, which are described in the examples of performance. The chemical composition of employed cement clinkers in wt.% is disclosed in TABLE I.

TABLE I

| Cement works of clinker | $SiO_2$ | CaO | $Al_2O_3$ | $Fe_2O_3$ | MgO | $SO_3$ | $Na_2O$ + $K_2O$ |
|---|---|---|---|---|---|---|---|
| Prachovice - Pr | 21,3 | 65,8 | 5,6 | 4,2 | 3,3 | 0,21 | 0,87 |
| Hranice - Hr | 20,0 | 62,2 | 5,8 | 3,7 | 2,9 | 0,17 | 0,81 |
| Malomerice - Ma | 20,6 | 63,5 | 4,7 | 4,5 | 2,9 | 0,16 | 0,91 |
| Stramberk - St | 21,9 | 67,3 | 6,3 | 2,8 | 1,3 | 0,30 | 0,95 |
| Lochkov - Lo | 21,4 | 65,1 | 5,7 | 2,4 | 1,9 | 1.05 | 0.85 |

Granulometry of the ground cement clinkers was indicated as Type A if the cement clinker had a continuous distribution curve of particle size, and as Type B if the cement clinker had the distribution of particle size cumulated mainly in the region below 20 μm.

The phenol condensate was prepared by the following procedure: An autoclave was charged with 500 wt. parts of a technical mixture of phenols with composition:

| | |
|---|---|
| vacuum pitch | 3.45 wt. % |
| neutral oils | 3.40 |
| cresols | 3.80 |
| xylenols | 2.35 |
| pyrocatechol | 45.80 |
| 3-methylpyrocatechol | 12.75 |
| 4-methylpyrocatechol | 28.75 | and with 800 wt. parts water, heated to 50° to 60° C.; 560 wt. parts of 90% technical sodium sulfite was added under stirring and 583 wt. parts of 36% formaldehyde was added within 30 min. The autoclave was sealed, heated under pressure to 130° C. for 30 min, cooled down to 60° C., and 50 parts of 40% aqueous solution of ferric chloride was slowly added under continuous stirring. The content of dry substances was adapted by addition of water to 25% to obtain the product ready to use. The resulting product is essentially a sodium-ferric salt of sulfomethylated condensation product of phenols with formaldehyde and is further indicated as NaSF.

Another product was prepared analogously with the distinction that the nondiluted product prepared as described above was oxidized for 30 min. by bubbling through air at 60° C. at the rate of 120 l/min. After oxidation, the content of dry substances was adjusted to 25 wt.% and the product was ready to use. This product is essentially a ferric salt of sulfomethylated condensation product of phenols with formaldehyde and is further indicated as FeSF.

The method for preparation of the hydraulic binding agent according to the invention was confirmed by numerous experiments; representative results of them are given in the following examples of performance. All percent values given in examples are related to the amount of cement clinker. The amount of formation water used is shown as the water coefficient w (so called "water/cement ratio"), which is given by the ratio of the amount of water to the amount of cement clinker.

EXAMPLE 1

Cement clinkers without addition of gypsum were used in the preparation of binding agents, which differ in the grain size and the size of specific surface area. The chemical composition and origin of the clinkers used are given in Table I.

Alkaline salts and the sulfomethylated condensation product were dissolved in formation water and then pastes were made by homogenizing the cement clinker with formation water.

Properties of the pastes are given in Table II, where the following abbreviations are used for admixtures applied into the formation water:

| | |
|---|---|
| NaC | means sodium carbonate |
| NaHC | means sodium hydrogencarbonate |
| KC | means potassium carbonate |
| NaSF | means the product obtained by condensation of pyrocatechol oil with formaldehyde in the presence of sodium sulfite, which is modified after condensation by addition of a solution of ferric chloride in such a way that half of the acidic groups was occupied with iron (III) ions |
| FeSF | means the condensation product NaSF, which was oxidized by passing it through air |

The following number scale, which is used in Table II, was chosen to comport with the workability of pastes:
0 ... nonworkable paste, a dry mixture
1 ... paste runs only by vibration 50 Hz
2 ... paste runs by pounding the mixing dish
3 ... paste runs by mere gravity
4 ... paste is very fluid
5 ... paste is very fluid with low viscosity.

If a lignin derivative was added to the formation water, its type is indicated by abbreviations:
NaLig means sodium lignosulfonate
CaLig means calcium lignosulfonate The values of setting and compression strength are given in Table II. The strength after 360 days was 130 MPa with sample No. 4; 100 MPa with No. 7 and 140 MPa with No. 12. The strength after 540 days was 97.5 MPa with sample No. 2 and 102 MPa with Nos. 5 and 7.

EXAMPLE 2

The preparation of the binding agent for mortars was similar to the preparation of pastes in Example 1, with the distinction that a part of the additives was mixed with the ground cement, and quartz sand of continuous granulometry was used in the ratio cement: sand of 1:3. Specimens 4×4×16 cm were prepared for measurement of the mortar strength. The molded specimens were allowed to stand for 24 hours after preparation of pastes or mortars in saturated water vapor (90 to 95% relative humidity) and then placed in tap water at +20° C. till the 28th day. After the 28th day, the specimens

TABLE II

Properties of the prepared pastes

| No. | Origin of Clinker | Sp. surface area (m²/kg) | Granulometric type | Additives in formation water (wt.-% of clinker) | w | Workability | Onset of setting | Compression strength (MPa) after | | | |
|---|---|---|---|---|---|---|---|---|---|---|---|
| | | | | | | | | 24 h | 7 days | 28 days | 180 days |
| 1. | Pr | 260 | A | 1% NaC + 0,5% NaLig + 0,15% NaSF | 0,25 | 2 | 60 min | 3 | 33 | 89 | 92 |
| 2. | | 280 | A | 1,2% NaC + 0,25% NaSF | 0,27 | 3 | 68 h | 41 | 61 | 72 | 80 |
| 3. | | 280 | A | 1% NaHC + 0,3% NaLig + 0,12% NaSF | 0,25 | 3 | 50 min | 14 | 60 | 100 | 117 |
| 4. | | 330 | A | 0,9% NaC + 0,5% NaLig + 0,25% NaSF | 0,23 | 5 | 230 min | 60 | 62 | 100 | 125 |
| 5. | | 550 | A | 1,2% NaC + 1% NaSF | 0,25 | 4 | 60 h | 50 | 76 | — | 102 |
| 6. | | 1000 | B | 2,3% NaC + 1,5% FeSF | 0,25 | 4 | 60 min | 112 | — | — | — |
| 7. | Hr | 380 | B | 1% NaC + 0,5% NaLig + 0,5% NaSF | 0,27 | 4 | 350 min | 6 | 90 | 92 | 96 |
| 8. | | 400 | B | 1,5% KC + 0,3% FeSF | 0,27 | 3 | 160 min | 26 | 70 | 103 | — |
| 9. | | 400 | B | 0,8% FeSF | 0,25 | 2 | 2 min | — | — | — | — |
| 10. | | 560 | B | 1,1% NaHC + 0,5% NaSF | 0,25 | 4 | 60 min | 58 | 97 | 99 | 138 |
| 11. | | 560 | B | 1% NaOH + 0,5% NaSF | 0,25 | 4-5 | 3 min | — | — | 100 | — |
| 12. | | 560 | A | 1% NaC + 0,5% NaSF | 0,25 | 5 | 30 min | 66 | 99 | 111 | 132 |
| 13. | | 630 | A | 1,4% NaC + 1% NaLig + 0,1% NaSF | 0,25 | 5 | 20 min | 50 | 66 | 102 | 150 |
| 14. | La | 360 | A | 1% NaC + 0,5% FeSF | 0,25 | 5 | 6 days | 17 | 64 | 84 | — |
| 15. | | 360 | A | 1% NaC + 0,3% FeSF | 0,25 | 5 | 2 days | 7 | 48 | 80 | — |
| 16. | | 760 | A | 1% NaC + 0,9% FeSF | 0,25 | 4-5 | 120 min | 81 | 103 | 111 | — |

Specimens of size 2×2×10 cm and 4×4×16 cm were made for strength tests from the pastes prepared from the described mixtures. Viscosity was determined in a rotation viscometer with coaxial cylinders at the velocity gradient 95 s$^{-1}$. The speed of paste setting was followed by needle penetration according to Vicat, the specific surface area of the clinker was determined from sedimentation curves by means of automatic sedimentation balances.

were stored in air at 20° C. and relative humidity of 40 to 45 rel.%.

The following number scale was chosen for evaluation of the workability of mortars and is used in Table III:
1 ... dry mortar, the specimens can be prepared after consolidation by vibration 50 Hz
2 ... plastic mortar with rubbery character
3 ... fluid mortar which flows from a mixing vessel by gravity.

The types of additives to the formation water are indicated as stated in Example 1.

TABLE III

Properties of the prepared mortars (1:3)

| No. | Origin of clinker | Sp. surface area (m²/kg) | Granulometric type | Additives in formation water (wt.-% of clinker) | w | Workability | Onset of setting | Compression strength (MPa) after 24 h | 7 days | 28 days | 180 days |
|---|---|---|---|---|---|---|---|---|---|---|---|
| 1. | Pr | 340 | A | 1% NaHC + 0,3 NaLig + 0,25% NaSF | 0,33 | 3 | 65 min | 46 | 60,1 | 64,8 | 70,1 |
| 2. |  | 400 | A | 1% NaC + 0,3% NaLig + 0,25% NaSF | 0,30 | 3 | 65 min | 55,7 | 72,1 | 76 | — |
| 3. |  | 230 | A | 1% NaC + 0,3% NaLig + 0,25% NaSF | 0,38 | 2 | 140 min | 2,2 | 6 | 52 | 72 |
| 4. | Hr | 380 | B | 0,8% NaC + 0,5% NaLig + 0,2% NaSF | 0,27 | 2-3 | 120 min | 29,6 | 52,1 | 67 | 68,3 |
| 5. |  | 380 | B | 1% NaC + 0,3 NaLig + 0,45 FeSF | 0,38 | 3 | 75 min | 1,4 | — | 76,2 | — |
| 6. |  | 520 | B | 1,5% NaHC + 0,5% NaLig + 0,8% NaSF | 0,34 | 2-3 | 75 min | 22,6 | 78,8 | 86 | 100 |
| 7. |  | 720 | B | 1% NaC + 1% CaLig + 1% NaSF | 0,31 | 3 | 30 min | 77,1 | 86,2 | 100 | — |
| 8. |  | 790 | B | 1,2% NaC + 1% NaLig + 0,7% NaSF | 0,33 | 3 | 35 min | 63,1 | 90,5 | 105,6 | — |
| 9. | Ma | 690 | A | 1% NaHC + 1,3% NaLig + 0,8% NaSF | 0,29 | 3 | 55 min | 46,8 | 90,6 | 102 | 112 |

EXAMPLE 3

Cement pastes were prepared with the ground clinker of Stramberk cement works with the specific surface area 700 m²/kg. The cement paste with water coefficient 0.25 was prepared, which always contained 1% sodium carbonate and 0.75% condensation product NaSF.

Various procedures were used in the preparation of the paste:

(a) A ground cement clinker was mixed with sodium carbonate and NaSF in a dry state and then formation water was added.

(b) A ground cement clinker and sodium carbonate were mixed in a dry state, whereas NaSF was added into formation water and a paste was prepared from the components after dissolution.

(c) A ground clinker was mixed in a dry state with NaSF, sodium carbonate was dissolved in formation water and a paste was prepared from the components.

(d) Sodium carbonate was first dissolved in formation water, NaSF was dissolved in this solution and a paste was prepared from the components.

(e) NaSF was first dissolved in formation water and then sodium carbonate was dissolved in this solution; a paste was then prepared from the components.

(f) A ground cement clinker and a half portion of NaSF and sodium carbonate were mixed in a dry state; the other half portion of NaSF and sodium carbonate was dissolved in water and then a paste was prepared from the components.

(g) A ground clinker was mixed with a half portion of sodium carbonate and with all the NaSF in a dry state; the other half portion of sodium carbonate was dissolved in water and then a paste was prepared from the components.

(h) A ground clinker was mixed with the whole portion of sodium carbonate and a half portion of NaSF in a dry state; the other half portion of the NaSF was dissolved in water and then a paste was prepared from the components.

| Way of preparation | Onset of setting |
|---|---|
| a | 2 h |
| b | 1.2 h |
| c | more than 6 h |
| d | 3.4 h |
| e | more than 6 h |
| f | 5 h |
| g | 3 h |
| h | 3 h |

It follows from the onset of sample setting that the beginning of setting of the binding agent may be purposefully controlled by chosing the way of preparation of the binding agent. The least suitable methods of paste preparation comprise addition of carbonate to the ground clinker in a dry state. Optimal procedure consists in the dissolution of all components in water, which is used for the paste preparation. An additional control of the beginning of setting of pastes from the binding agent, which was prepared e.g. by grinding with half portions of sodium carbonate and the condensation product, is again optimal due to the addition of components dissolved in formation water and not in a dry state.

EXAMPLE 4

A clinker from the Hranice cement works was ground in the presence of 0.25% sodium lignosulfonate to the cement of the specific surface area 270 m²/kg; a mortar having a sand-cement ratio of 3:1, which contained 1% sodium carbonate and 0.3% condensation product FeSF. The mortar was very workable at w=0.40 and began to set after 45 minutes. After setting, the mortar was allowed to stand in the medium saturated with water vapor for 30 min. and then was placed in a space heated with steam. During a further 30 minutes, the temperature was raised to 100° C. and the mortar was heated for 60 min. After steam curing, the samples were allowed to cool for 30 minutes. The compression strength was 15 MPa after 60 min. of steam curing, i.e. after 2.5 hours from mortar preparation.

EXAMPLE 5

A cement clinker of Hranice cement works was ground in the presence of 1% sodium lignosulfonate to the cement of specific surface area 740 m²/kg. A fluid mortar 1:3 was prepared from this cement at w=0.33 and contained 0.5% condensation product FeSF, 1.2% sodium carbonate and 0.05% defoamer. The mortar began to set after 40 minutes and attained after 24 hours at 20° C. the compression strength 68 MPa, after 7 days 81 MPa and after 28 days 100 MPa. The same mortar, which was exposed after setting to the effect of steam at 100° C. for 15 min., attained the compression strength 40 MPa after subsequent cooling to 20° C. for 30 minutes.

EXAMPLE 6

A cement clinker of Hranice cement works was ground with the addition of 1% sodium lignosulfonate to the specific surface area 720 m²/kg. A mortar (cement:sand of 1:3, w=0.33) was prepared with addition of 1% sodium carbonate and 0.5% NaSF. The preparation of mortar was carried out at +20° C. After 15 minutes from preparation, the unset mortar in a mold was placed into a space of constant temperature −8° to −10° C. and parallelly into a space of temperature −30° C. Before measurement of compression strength, the specimens 4×4×16 cm were allowed at +20° C. for 40 min. The results are shown in Table IV.

TABLE IV

| Temperature | compressive strength (MPa) | | |
|---|---|---|---|
| | 1 day | 7 days | 28 days |
| −8 to −10° C. | 10,1 | 30,4 | 62,2 |
| −30° C. | 4 | — | 15 |

If NaSF was replaced with the same amount of sodium lignosulfonate, the attained strengths were by 20 to 50% lower at the same temperatures.

EXAMPLE 7

A cement clinker of Hranice cement works ground to the specific surface area 600 m²/kg in the presence of 0.5% sodium lignosulfonate was used in the preparation of cement mortar. The prepared mortar (cement:sand of 1:3, w=0.30) was prepared with the addition of 0.25% NaSF and 1% sodium carbonate. The reference mortar of the same visual consistency (cement:sand of 1:3, w=0.50) was also prepared using a portland cement of Czechoslovak provenance (class 400). Both mortars were stored after setting in a saturated water vapor for 24 hours and then placed into solutions of corrosive salts. The results of attained strengths after one year of continuous storage are in Table V.

TABLE V

| salt solution | bending strength, MPa | | compressive strength MPa | |
|---|---|---|---|---|
| | mortar | control | mortar | control |
| ammonium sulphate 135 g/l | 9,8 | deteri | 37,9 | deteri |
| ammonium sulphate 0,68 g/l | 15,5 | 6,1 | 108,6 | 82,3 |
| sodium chlorate 164 g/l | 13,9 | 7,5 | 100,2 | 72,8 |
| sodium chlorate 0,82 g/l | 18,8 | 8,2 | 103,2 | 64,9 |

EXAMPLE 8

Various salts of sulfomethylated condensation products of phenols with formaldehyde were used in the preparation of the cement binding agent:
SFK 1 is the product FeSF, which was further oxidized with air during spray drying
SFK 2 is the condensation product of pure pyrocatechol, where a half of acidic groups is occupied by chromium (III) ions,
SFK 3 is the condensation product of pyrocatechol oil, where a half of acidic groups is occupied by aluminum (III) ions.

These condensation products were used in the preparation of pastes of w=0.20. The cement clinker of Prachatice cement works ground to the specific surface area 590 m²/kg in the absence of gypsum was used for the preparation of the paste. The paste contained 0.6% sulfomethylated phenol condensate and 0.9% sodium carbonate. The workability and onsets of setting of prepared pastes are given in Table VI.

TABLE VI

| Type of phenolic condensate | workability acc Ex. 2 | Setting times (min) |
|---|---|---|
| FeSF | 5 | 90 |
| SFK 1 | 5 | 70 |
| SFK 2 | 4 | 40 |
| SFK 3 | 4–5 | 50 |

EXAMPLE 9

The usefulness of salts of sulfomethylated condensation products of phenols with formaldehyde for the modification of cement setting was proven by tests with other products, which were prepared from phenolic raw materials and transferred to salts containing ferric ions. Types of these raw materials are surveyed in Table VII.

TABLE VII

| indication | Raw material | Phenol or phenolic mixture | | | | | | | |
|---|---|---|---|---|---|---|---|---|---|
| | | phenol cresol | xylenol | pyro-catechol | methyl-pyro-catechol | methyl-pyrolatechol | resorcinol and homologues | dimethyl pyro-catechol | higher phenols |
| SFK4 | pyrocatechal oil | 4,7 | 3,9 | 28,1 | 10,3 | 27,0 | 13,2 | 12,8 | 0 |
| SFK5 | pyrocatechal fraction No. 1 | 33,6 | 55,1 | 6,7 | 1,7 | 1,5 | 0 | 1,4 | 0 |
| SFK6 | fraction No. 2 | 10,4 | 8,1 | 38,9 | 23,0 | 10,0 | 2,3 | 7,3 | 0 |
| SFK7 | fraction No. 3 | 2,8 | 1,0 | 30,4 | 22,7 | 14,6 | 0 | 28,5 | 0 |
| SFK8 | fraction No. 5 | 0 | 2,1 | 9,8 | 8,9 | 4,9 | 16,4 | 13,5 | 44,6 |
| SFK9 | fraction No. 6 | 0 | 2,2 | 4,0 | 3,7 | 36,0 | 37,6 | 14,0 | 2,5 |

TABLE VII-continued

| | | Phenol or phenolic mixture | | | | | | | |
|---|---|---|---|---|---|---|---|---|---|
| indication | Raw material | phenol | cresol | xylenol | pyrocatechol | methylpyrocatechol | methylpyrolatechol | resorcinol and homologues | dimethylpyrocatechol | higher phenols |
| SFK10 | phenolcresol | 26,6 | 73,4 | 0 | 0 | 0 | 0 | 0 | 0 |
| SFK11 | optol | 2,2 | 6,6 | 50,8 | 25,5 | 8,2 | 0 | 6,7 | 0 |
| SFK12 | resorcinol fraction | 0 | 1,8 | 1,9 | 0,8 | 9,0 | 58,6 | 5,8 | 22,7 |
| SFK13 | pyrocatechol | 0 | 0 | 100,0 | 0 | 0 | 0 | 0 | 0 |
| SFK14 | resorcinol | 0 | 0 | 0 | 0 | 0 | 100,0 | 0 | 0 |

The above condensation products were used in the preparation of a cement paste of w=0.20, which had the following composition: a clinker ground to the specific surface area 590 m²/kg, formation water with 0.8% of the condensation product and 1% sodium carbonate. The workability of cement pastes was evaluated visually using the formerly given scale; the results are surveyed in Table VIII.

TABLE VIII

| Type of phenolic condensate | workability (see Example 2) |
|---|---|
| SFK6 | 4 |
| SFK5 | 3 |
| SFK6 | 3-4 |
| SFK7 | 4-5 |
| SFK8 | 4-5 |
| SFK9 | 5 |
| SFK10 | 3 |
| SFK11 | 5 |
| SFK12 | 4-5 |
| SFK13 | 4-5 |
| SFK14 | 5 |

EXAMPLE 10

A paste was prepared from the finely ground clinker of Hranice cement works (granulometry of Type B), which viscosity was measured with a rotation viscometer at the velocity gradient 95 s⁻¹ in the dependence on time. The paste contained, in addition to sodium carbonate, also the setting regulator FeSF and, in one case, also gypsum. The setting times are compared in Table IX.

TABLE IX

| Paste Composition w = 0.35 0.3% FeSF 1.2% Na₂CO₃ 5% gypsum | Viscosity (Pa · s) | 0,8 | 1 | 1,1 | 1,2 | 1,4 | 2,0 |
| | Time (min) | 4 | 5 | 7 | 11 | 15 | 20 |
| | After 25 minutes a tough paste which cannot be measured | | | | | | |
| Paste composition w = 0.30 0.3% FeSF 1.2% Na₂CO₃ | Viscosity (Pa · s) | 0,3 | 0,4 | 0,38 | 0,41 | 0,51 | 0,6 | 0, |
| | Time (min) | 4 | 20 | 60 | 120 | 140 | 150 | 155 |
| | The paste starts setting after 60 min | | | | | | |

EXAMPLE 11

A clinker of Stamberk cement works (the chemical composition see in Table I) was ground to the specific surface area 600 m²/kg and used in the preparation of a loosely running paste of w=0.25, which was admixed with 1 wt.% sodium lignosulfonate, 1 wt.% sodium carbonate and 0.3 wt.% setting regulator FeSF. The attained strengths are shown in Table X.

TABLE X

| Type of alkaline salt (1 wt. %) | Onset of setting (min) | Compression strength (MPa) | | | |
|---|---|---|---|---|---|
| | | after 1 day | 7 days | 28 days | 180 days |
| sodium carbonate | 125 | 74 | 110 | 119 | 180 |
| sodium hydrogen- | 180 | 19 | 112 | 130 | 176 |

EXAMPLE 12

A clinker of Hranice cement works was ground to a gypsum-free cement of the specific surface area 700 m²/kg in the presence of 0.5% sodium lignosulfonate. A loosely running paste of w=0.25 was prepared from this cement, whereas 1.25 wt.% sodium carbonate and 1.25 wt.% setting regulator FeSF was added to formation water (related to the weight of original clinker). Setting of the paste starts after 40 minutes. The compression strength was after 2 h, 3 MPa; after 6 h, 15 MPa; after 14 h, 53 MPa; after 24 h, 54 MPa; after 7 days, 80 MPa; and after 28 days, 100 MPa. A reference test using the same cement, where the FeSF setting regulator, according to this example, was replaced by the addition of 0.5 wt.% sodium lignosulfonate, gave 50 to 100% lower strength achieved after 2 to 14 hours.

EXAMPLE 13

A cement clinker of Malomerice cement works was ground to the specific surface area 680 m²/kg in the presence of 1 wt.% calcium lignosulfonate. A paste was prepared from this gypsum-free cement, which contained 1 wt.% sodium carbonate and 0.4 wt.% setting regulator NaSF related to the weight of original clinker. The paste had w=0.20, a loosely running appearance and began to set after 15 minutes. The compression strength was 94.5 MPa after 24 hours.

EXAMPLE 14

A clinker of Hranice cement works was ground in the presence of 0.25 wt.% sodium lignosulfonate to the cement of specific surface area 270 m²/kg; a mortar was prepared from its 1:3 mixture with sand, which contained 1 wt.% sodium carbonate and 0.3 wt.% setting regulator FeSF calculated on the total weight of the original clinker. The mortar of w=0.40 was very workable and began to set after 45 minutes. After setting, it was left for 30 minutes in a medium saturated with water vapor and then transferred into a space heated with steam. During a further 30 minutes, the temperature was raised to 100° C. and the mortar was heated for another 60 minutes. The samples after steam curing were allowed to cool for 30 min. and then used for the determination of strength at 20° C. The compression strength after 60 minutes of steam curing, i.e. after 2.5 hours from the mortar preparation, was 15 MPa.

EXAMPLE 15

A clinker of Hranice cement works was ground with the addition of 0.25 wt.% sodium lignosulfonate to the specific surface area 300 m$^2$/kg. A mortar prepared from this cement (cement-sand 1:3; w=0.43) contained 0.5 wt.% sodium lignosulfonate, 1 wt.% sodium carbonate and 1.1 wt.% setting regulator NaSF, always related to the weight of clinker. Cement was mixed, before the mortar preparation, with 20 wt.% of flying ashes from power station. After setting, the mold was placed in the space heated with steam, where the temperature was raised to 100° C. within 30 min. and then held for 60 min. The compression strength of specimens 4×4×16 cm was determined 30 min. after removing from the heated space and was 10.4 MPa. Other specimens were placed for 28 days in a space with 95% relative humidity and attained the compression strength 23 MPa. The remaining specimens were then stored for one year in air of relative humidity 35-45% and reached the compression strength 32 MPa.

EXAMPLE 16

A finely ground clinker of Prachovice cement works, with the specific surface area 600 m$^2$/kg, which was ground with the addition of 1.5% of a surface active compound mainly consisting of sodium lignosulfonate; 1.2% setting regulator FeSF was added to cement in a dry state and 1% sodium carbonate was dissolved in formation water. All additives were calculated on the weight of the clinker. The composition of a concrete mixture was cement—sand—aggregates 1:2:3 and w=0.31. Cubes 15×15×15 cm were made from the concrete mixture. After setting, the cubes were exposed to 60° C. steam for 2 hours. The compression strength attained after 30 min. of cooling was 40 MPa.

EXAMPLE 17

A clinker of Hranice cement works was ground with addition of 1% setting regulator NaSF to the specific surface area 570 m$^2$/kg and used for preparation of a loosely running paste of w=0.25 with addition of 1% sodium carbonate, related to the weight of clinker. The paste was prepared at +20° C. After 15 minutes, the nonsetting loosely running paste was placed in a space with temperature −1° to −2° C., where the temperature was decreased after 4 hours to a constant level −8° to −10° C. Specimens 2×2×2 cm were left at this temperature until the testing of compression strength. Before the compression strength was determined, the specimens were allowed to stand at +20° C. for 45 min. The compression strength, attained after 24 hours from the paste preparation, was 18.2 MPa; after 7 days, 50 MPa; and after 28 days, 62 MPa.

If the regulator NaSF was replaced with the same amount of sodium lignosulfonate or sulfonated lignin, and sodium carbonate was replaced with sodium hydrogencarbonate, the obtained strengths were 50 to 100% lower.

EXAMPLE 18

A clinker of Hranice cement works was ground to the cement of specific surface area 520 m$^2$/kg with the addition of 0.5% calcium lignosulfonate. The same clinker was also ground with 0.5% regulator FeSF to the cement of specific surface area 560 m$^2$/kg. A grouting paste was prepared from these cements (cement-sand 1:10, sand of maximum grain size 2 mm) with addition of other compounds. The resulting strengths are in Table XI.

TABLE XI

| admixtures | surfare m$^2$/kg | setting time (min) | 2 hours | compressive strength, MPa | | |
|---|---|---|---|---|---|---|
| | | | | 1 day | 7 days | 28 days |
| 1% Na$_2$CO$_3$ 1% NaLig 0,1% FeSF | 520 | 120 | — | 1,6 | 6,3 | 6.8 |
| 1% Na$_2$CO$_3$ 0,5 FeSF | 560 | 10 | 0,35 | 3,9 | 7,2 | 8,7 |
| 1% Na$_2$CO$_3$ 0.5% NaLig 0.1% FeSF | 380 | 10 | 0,30 | 3,2 | 6,4 | 8,0 |

EXAMPLE 19

A mortar (cement-sand 1:3, w=0.33) containing 1% sodium carbonate, 0.5% sodium lignosulfonate and 0.5% regulator NaSF was prepared from a finely ground clinker (600 m$^2$/kg) of Hranice cement works. The mortar after setting was placed in a medium with 95% relative humidity for 24 h. Then the mortar specimens of size 4×4×16 cm were placed into a 5% solution of sulfuric acid. After 180 days of continuous immersion in this solution, the loss of the specimen amounted to 2.5 mm from its surface. An increased content of sulfur had not been found already in the distance less than 0.3 mm from the surface of specimen by the analysis of fracture surface on the scanning microscope JEOL 50A with the apparatus EDAX.

EXAMPLE 20

A clinker of Hranice cement works was ground in the presence of 1 wt.% sodium lignosulfonate to a cement with the specific surface area 710 m$^2$/kg. A concrete, with the ratio cement—sand—aggregates 1:3:3 and w=0.33, was prepared from this cement with addition of 1 wt.% setting regulator FeSF and 1 wt.% sodium carbonate, calculated on the total weight of clinker. The concrete began to set after 30 min. and was considerably aerated because it contained 12-15% closed pores of size 0.5-1 mm; after 24 hours, the concrete attained the strength 40 MPa.

EXAMPLE 21

A concrete of the same composition and water coefficient was prepared as in Example 19; only the concentration of additives was changed. By application of 1.5% sodium carbonate and 2% regulator FeSF, the onset of concrete setting is postponed to one hour.

EXAMPLE 22

A clinker of Prachovice cement works ground to the specific surface area 700 m$^2$/kg was used for the preparation of concrete wth the composition cement—sand—aggregated 1:3:3. The mixture containing 1% potassium carbonate, 1% regulator NaSF and 1.5% CaLig as additives had, at the water coefficient 0.26, a wet character and the onset of setting after 20 minutes. If the concentration of NaSF was increased to 2.5% and the water coefficient to 0.29, the concrete mixture was fluid and began to set after 40 min.

EXAMPLE 23

In addition to the above mentioned sulfomethylated condensates indicates as NaSF and FeSF, further derivatives were also prepared by oxidation. The preparation NaSF was oxidized with air during spray-drying in the chamber of an oven at 70°–90° C. and, immediately after drying, was cooled with a stream of cold air and packed into bags with a water impermeable lining. This derivative is further indicated as SFK1. The derivative indicated as SFK2 was prepared in the following way: A reaction kettle was charged with 100 weight parts of water, 500 weight parts of pyrocatechol and 10 parts of 96% sulfuric acid, temperature was set to 55°–60° C. and 284 weight parts of 36% formaldehyde was added at this temperature within 30 minutes. Then, 636 wt. parts of 90% sodium hydrogensulfite and 397 wt. parts of formaldehyde was stepwise added. Temperature was gradually increased to 95° C. and then kept for 90 min. The reaction was completed when the sample of the reaction mixture was soluble in 20% sulfuric acid. Then, 65 parts of crystalline chromium (III) sulfate dissolved in 100 parts water and 50 parts 96% sulfuric acid was added. Eventually, the content of dry substances was adapted to 30% to obtain the product SFK2.

The derivative SFK3 was prepared by the following procedure: Sulfonation of 280 wt. parts of β-naphtol with 240 wt. parts of 95% sulfuric acid was carried out in a sulfonation reactor at 110° C. The resulting sulfonation mixture was transferred into a condensation reactor charged with 500 wt. parts of a technical mixture of phenols of composition:

| water | 11.6 wt. % | xylenols | 3.3 wt. % |
|---|---|---|---|
| neutral oils | 3.6 | pyrocatechol | 31.2 |
| vacuum pitch | 2.9 | 3-methylpyrocatechol | 15.2 |
| phenol | 0.3 | 4-methylpyrocatechol | 28.5 |
| cresols | 3.4 | | | and with 500 wt. parts water. Temperature was set to 45°–55° C. and 375 wt. parts of formaldehyde was gradually added at this temperature within 60 min. Stirring was continued for 60 min. after the addition was completed and then 40 wt. parts crystalline aluminum (III) sulfate dissolved in 80 parts water and 200 wt. parts 40% sodium hydroxide were added. The mixture after neutralization was oxidized during drying in a spray drier.

The above described sulfomethylated phenolic condensates were used in the preparation of pastes with w=0.20. The pastes were prepared from a clinker of Prachovice cement works ground to the specific surface area 590 m$^2$/kg in the absence of gypsum. The paste contained 0.6 wt.% sulfomethylated phenolic condensate and 0.8 wt.% sodium carbonate related to the weight of clinker. The workability and beginning of setting of the resulting pastes are given in Table XII.

TABLE XII

| Type of phenolic condensate | workability (see Ex. 2) | Setting time (minutes) |
|---|---|---|
| FeSF | 5 | 90 |
| SFK1 | 5 | 70 |
| SFK2 | 4 | 40 |
| SFK3 | 4–5 | 50 |

EXAMPLE 24

A clinker of Hranice cement works was ground to the specific surface area 400 m$^2$/kg and used for pastes with w=0.25. The pastes contained 1% sodium carbonate and 0.7% sodium salt of the sulfonated condensation product of phenols with formaldehyde or the product FeSF. If FeSF was used, the workability of paste was 5 and setting began after 300 min., if the sulfonated derivative was used, the workability was 3 and setting started after ten min.

EXAMPLE 25

A clinker of Malomerice cement works was ground to the cement with the specific surface area 700 m$^2$/kg with addition of 0.1% diethyl carbonate as a grinding additive, and in the absence of gypsum. Loosely running pastes were prepared from this cement by addition of 27% formation water, which began to set after 30 minutes if 0.9% condensation product FeSF and 0.8% sodium oxalates were added.

EXAMPLE 26

A clinker of Hranice cement works was ground with addition of 0.5% sodium lignosulfonate as a grinding additive to the cement of specific surface area 460 m$^2$/kg. A mortar (cement-sand 1:3) was prepared with 0.7% sodium sulfate and 0.8% condensation product FeSF by addition of 32% formation water. The setting of mortar began after 45 minutes and the strength after 28 days was 60 MPa.

EXAMPLE 27

A commercial portland cement of class 400, i.e. ground in the presence of gypsum, and a clinker of Stramberk cement works ground to the specific surface area 620 m$^2$/kg in the presence of 0.1 wt.% sodium lignosulfonate as a grinding additive (grinding intensifer) were used to prepare cement pastes with the water coefficient 0.24 using the additives described in the invention and their combinations. The properties are given in the following Table XIII. The percent amounts are related to the weight of cement.

TABLE XIII

| No. | Cement | Additives | Workability |
|---|---|---|---|
| 1 | PC 400 | sodium silicate (1 wt. %) | 0 |
| 2 | PC 400 | KHSO$_4$ (1%) | 0 |
| 3 | PC 400 | sodium oxalate (0.8%) | 0–1 |
| 4 | PC 400 | NaSF (0.5%) | 1 |
| 5 | Stramberk 620 | sodium silicate (1%) | 0–1 |
| 6 | Stramberk 620 | KHSO$_4$ (1%) | 0 |
| 7 | Stramberk 620 | Sodium oxalate (0.8%) | 0–1 |
| 8 | Stramberk 620 | NaSF (0.8%) | 1 |
| 9 | Stramberk 620 | NaSF (0.8%) + sodium silicate (1%) | 4–5 |
| 10 | Stramberk 620 | NaSF (0.8%) + sodium oxalate (0.8%) | 3–4 |
| 11 | Stramberk 620 | NaSF (0.8%) + KHSO$_4$ (1%) | 3 |

An empiric scale based on visual judgment was used for evaluation of rheologic properties of pastes, where the following workability degrees were indicated as:
0 . . . dry paste which cannot be worked
1 . . . a paste flowing only at vibration 50 Hz
2 . . . a paste flowing by pounding the mixing dish
3 . . . a paste flowing from a mixing dish by gravity
4 . . . a paste is loosely running
5 . . . a paste is loosely running with low viscosity As follows from the given reference samples, first the simultaneous presence of alkaline salt and the sulfomethylated condensate according to samples No. 9–11 allows the preparation of pastes with a low water coefficient. The individual components do not give this result both with portland cement (see samples no. 1–4) and with a cement without gypsum (see samples No. 5–8). This experimentally proved synergistic effect has not been described so far and represents a higher quality when compared with the known state of the art.

The above given examples show that the onset of paste setting depends on the specific surface area of cement, where the beginning of setting is reduced with the increasing surface area. The onset of setting also depends on the salt employed, where the mixture with hydrogensulfate has, at the same concentration, the shortest time of setting, whereas the mixture with oxalate was a postponed beginning and the latest onset has the mixture with silicate. This enables the adaptation to the setting periods.

EXAMPLE 28

A clinker ground to the specific surface area 2700 $m^2/kg$ with the addition of 3% NaSF and 2.9% sodium silicate was used for preparation of a cement paste. The paste with the water coefficient 0.37 had a loosely running character. The same cement without the above additives was first workable at the water coefficient 0.8.

I claim as my invention:

1. A rapidly binding high-strength cement binding agent comprising (a) a hydraulic cement ground without addition of gypsum to the specific surface area 150 to 3000 $m^2/kg$, 5 to 95 weight % particles of which are smaller than 5 $\mu m$, (b) a compound selected from the group consisting of an alkaline hydroxide, carbonate, hydrogen-carbonate, silicate, hydrogensilicate, hydrogensulfite and oxalate, in the amount of 0.1 to 10 weight % of the weight of ground cement, (c) a water-soluble salt of a sulfomethylated condensation product of phenols to which formaldehyde has been added, wherein said salt includes up to 70% of a trivalent cation selected from the group consisting of iron, aluminum and chromium, said salt being present in the amount of 0.1 to 5 weight % based on the weight of ground cement, and (b) formation water in the amount of at least 20 weight % of the weight of the ground cement.

2. The rapidly binding high-strength cement binding agent as claimed in claim 1, wherein the phenol is a dihydric phenol.

3. The rapidly binding high-strength cement binding agent as claimed in claim 2, wherein the dihydric phenol is pyrocatechol or its homologues.

4. The rapidly binding high-strength cement binding agent as claimed in claim 1, wherein the salt of sulfomethylated condensation product of phenols to which said formaldehyde has been added is at least partly transferred into a quinoic form by action on the phenol condensation product of at least 0.5 weight parts of oxygen per one weight part of said condensation product of said phenols.

5. A rapidly binding high-strength mortar comprising (a) a hydraulic cement ground without addition of gypsum to the specific surface area 150 to 3000 $m^2/kg$, 5 to 95 weight % particles of which are smaller than 5 $\mu m$, (b) a compound selected from the group consisting of an alkaline hydroxide, carbonate, hydrogencarbonate, silicate, hydrogensilicate, hydrogensulfite and oxalate, in the amount of 0.1 to 10 weight % of the weight of ground cement, (c) a water-soluble salt of a sulfomethylated condensation product of phenols to which formaldehyde has been added, wherein said salt includes up to 70% of a trivalent cation selected from the group consisting of iron, aluminum and chromium, said salt being present in the amount of 0.1 to 5 weight % based on the weight of the ground cement, (d) formation water in the amount of at least 20 weight % of the weight of ground cement, and (e) an amount of sand sufficient to effect rapid binding of said mortar.

6. A rapidly binding high-strength concrete comprising (a) a hydraulic cement ground without addition of gypsum to the specific surface area 150 to 3000 $m^2/kg$, 5 to 95 weight % particles of which are smaller than 5 $\mu m$, (b) a compound selected from the group consisting of an alkaline hydroxide, carbonate, hydrogen-carbonate, silicate, hydrogensilicate, hydrogensulfite and oxalate, in the amount of 0.1 to 10 weight % of the weight of ground cement, (c) a water-soluble salt of a sulfomethylated condensation product of phenols to which formaldehyde has been added, wherein said salt includes up to 70% of a trivalent cation selected from the group consisting of iron, aluminum and chromium, said salt being present in the amount of 0.1 to 5 weight % based on the weight of ground cement, (d) formation water in the amount of at least 20 weight % of the weight of ground cement, and (e) an amount of sand and aggregates sufficient to effect rapid binding of said concrete.

7. A method for production of a rapidly binding high-strength cement binding agent which comprises (1) grinding, in the absence of gypsum, a clinker of a portland cement to the specific surface area 150 to 3000 $m^2/kg$ and to the percent fraction of particles smaller than 5 $\mu m$ ranging from 5 to 95 weight %, said cement having a dry weight, (2) dissolving (a) from 0.1 to 5 weight % of a water-soluble salt of a sulfomethylated condensation product of phenols to which formaldehyde has been added, wherein said salt includes up to 70% of a trivalent cation selected from the grouup consisting of iron, aluminum and chromium, and (b) from 0.1 to 10 weight % of a compound selected from the group consisting of an alkaline hydroxide, carbonate, hydrogencarbonate, silicate, hydrogensilicate, hydrogensulfite and oxalate, in formation water, and (3) mixing the ground cement with at least 20 weight % of said formation water, all abovesaid weight percentages being based on the dry weight of ground cement.

8. Method for production of a rapidly binding high-strength cement binding agent which comprises (1) grinding, in the absence of gypsum, a clinker of a portland cement to the specific surface area 150 to 3000 $m^2/kg$ and to the percent fraction of particles smaller than 5 $\mu m$ ranging from 5 to 95 weight %, said cement having a dry weight, (2) dissolving (a) from 0.1 to 5 weight % of a water-soluble salt of a sulfomethylated condensation product of phenols to which formaldehyde has been added, wherein said salt includes up to 70% of a trivalent cation selected from the grouup consisting of iron, aluminum and chromium, said condensation product being transferred at least partly into a quinolic form by the action of at least 0.5 weight percent of oxygen based upon 1 weight percent of phenols, and (b) from 0.1 to 10 weight % of a compound selected from the group consisting of an alkaline hydroxide, carbonate, hydrogencarbonate, silicate, hydrogensilicate, hydrogensulfite and oxalate, in formation water, and (3) mixing the ground cement with at least 20 weight % of said formation water, all abovesaid percentages being based on the dry weight of ground cement.

* * * * *

UNITED STATES PATENT AND TRADEMARK OFFICE
CERTIFICATE OF CORRECTION

PATENT NO. : 4,551,176

DATED : November 5, 1985

INVENTOR(S) : Frantisek Skvara, Karel Kolar, Zdenek Zadak, Znedek Friml, Jaroslay Novotry It is certified that error appears in the above-identified patent and that said Letters Patent is hereby corrected as shown below:

On title page, Column 1, Line 12, insert:

[73] Ceskoslovenska Akademie Ved, Prague, Czechoslovakia

Signed and Sealed this

Fourth Day of February 1986

[SEAL]

Attest:

Attesting Officer

DONALD J. QUIGG

Commissioner of Patents and Trademarks